United States Patent
Seybert et al.

(10) Patent No.: US 12,033,766 B2
(45) Date of Patent: Jul. 9, 2024

(54) METHOD FOR CONDITIONING ION EXCHANGE RESINS AND APPARATUS FOR CARRYING OUT THE METHOD

(71) Applicant: FRAMATOME GMBH, Erlangen (DE)

(72) Inventors: Gert Seybert, Erlangen (DE); Robert Lehr, Erlangen (DE); Bertram Zeiler, Erlangen (DE); Philip Schuberth, Erlangen (DE); Steffen Weiss, Erlangen (DE)

(73) Assignee: FRAMATOME GMBH (DE)

( * ) Notice: Subject to any disclaimer, the term of this patent is extended or adjusted under 35 U.S.C. 154(b) by 628 days.

(21) Appl. No.: 17/413,365

(22) PCT Filed: Nov. 28, 2019

(86) PCT No.: PCT/EP2019/082826
§ 371 (c)(1),
(2) Date: Jun. 11, 2021

(87) PCT Pub. No.: WO2020/120143
PCT Pub. Date: Jun. 18, 2020

(65) Prior Publication Data
US 2022/0020507 A1 Jan. 20, 2022

(30) Foreign Application Priority Data
Dec. 12, 2018 (DE) .................... 10 2018 131 902.9

(51) Int. Cl.
*G21F 9/12* (2006.01)
*B01J 45/00* (2006.01)
(Continued)

(52) U.S. Cl.
CPC ................ *G21F 9/12* (2013.01); *B01J 45/00* (2013.01); *B01J 49/30* (2017.01); *B01J 49/50* (2017.01);
(Continued)

(58) Field of Classification Search
None
See application file for complete search history.

(56) References Cited

U.S. PATENT DOCUMENTS

| | | | |
|---|---|---|---|
| 3,669,631 A | 6/1972 | Dietrich | |
| 4,437,999 A | 3/1984 | Mayne | |

(Continued)

FOREIGN PATENT DOCUMENTS

| AT | 43561 B | 8/1910 |
|---|---|---|
| CN | 103183320 A | 7/2013 |

(Continued)

OTHER PUBLICATIONS

International Search Report Issued in International Application No. PCT/EP2019/082826, Issued Mar. 25, 2020, 2 pages.
(Continued)

*Primary Examiner* — John J Figueroa
(74) *Attorney, Agent, or Firm* — Dilworth IP, LLC

(57) ABSTRACT

A method for conditioning of spent ion exchange resins from nuclear facilities comprises the steps of: mixing the spent ion exchange resins with water to form a reaction mixture; setting and controlling the pH of the reaction mixture in a range from 1.0 to 3.5, preferably in a range from 2.0 to 3.0; adding an oxidant to the reaction mixture, with the temperature of the reaction mixture maintained at 90°° C. or less so that the spent ion exchange resin and the oxidant react with each other to form an aqueous reaction solution comprising the organic reaction products of the spent ion exchange resin; and electrochemically oxidizing the organic reaction
(Continued)

products, wherein carbon dioxide is produced and a carbon-depleted aqueous reaction solution having a TOC (total organic carbon) value of less than 50 ppm is obtained. Furthermore, an apparatus for the conditioning of spent ion exchange resins from nuclear facilities is described.

22 Claims, 1 Drawing Sheet

(51) Int. Cl.
    *B01J 49/30*      (2017.01)
    *B01J 49/50*      (2017.01)
    *G21F 9/30*      (2006.01)

(52) U.S. Cl.
    CPC .......... *G21F 9/30* (2013.01); *B01J 2219/0879* (2013.01)

(56) References Cited

U.S. PATENT DOCUMENTS

| | | | |
|---|---|---|---|
| 4,624,792 A | 11/1986 | Yamanaka et al. | |
| 4,877,558 A | 10/1989 | Morioka et al. | |
| 8,372,289 B2 * | 2/2013 | Gassen | G21F 9/28 210/673 |
| 10,163,536 B2 | 12/2018 | Strohmer et al. | |
| 2007/0029260 A1 * | 2/2007 | Wismer | C02F 1/42 210/668 |
| 2010/0108609 A1 * | 5/2010 | Wismer | B01J 45/00 210/206 |
| 2010/0256435 A1 * | 10/2010 | Gassen | G21F 9/304 588/2 |
| 2018/0308597 A1 | 10/2018 | Strohmer et al. | |

FOREIGN PATENT DOCUMENTS

| | | |
|---|---|---|
| CN | 107004450 A | 8/2017 |
| CN | 108231235 A | 6/2018 |
| DE | 3781984 T2 | 2/1993 |
| DE | 602004003464 T2 | 9/2007 |
| DE | 102014002450 A1 | 8/2015 |
| EP | 1564188 A1 | 8/2005 |
| EP | 1786000 A1 | 5/2007 |
| EP | 2248134 B1 | 6/2011 |
| JP | H10204206 A | 8/1998 |
| JP | 2003050296 A | 2/2003 |
| JP | 2003057395 A | 2/2003 |
| JP | 2000065986 A | 3/2003 |
| JP | 4675521 B2 | 4/2011 |

OTHER PUBLICATIONS

R. G. Charman and M. A. Twissell "Wet oxidation mobile pilot plant demonstration on organic radioactive wastes", European Commission EUR 19064, 1999, 58 pages.

L. J. Xu et al., "Treatment of spent radioactive cationic exchange resins used in nuclear power plants by Fenton-like oxidation process", E-Journal of Advanced Maintenance, vol. 9-2 (2017) 145-151.

C. Srinivas et al., "Management of Spent Organic Ion-Exchange Resins by Photochemical Oxidation", WM'03 conference, Feb. 23-27, 2003.

Cheng, J. et al., New REsearch Progress on the Oxidative Decomposition Technology for Spent Radioactive Ion Exchange Resin, School of Science and Technology, Southwest University, Mianyang, China, Journal of Isotopes, vol. 25, May 2012, pp. 124-128.

\* cited by examiner

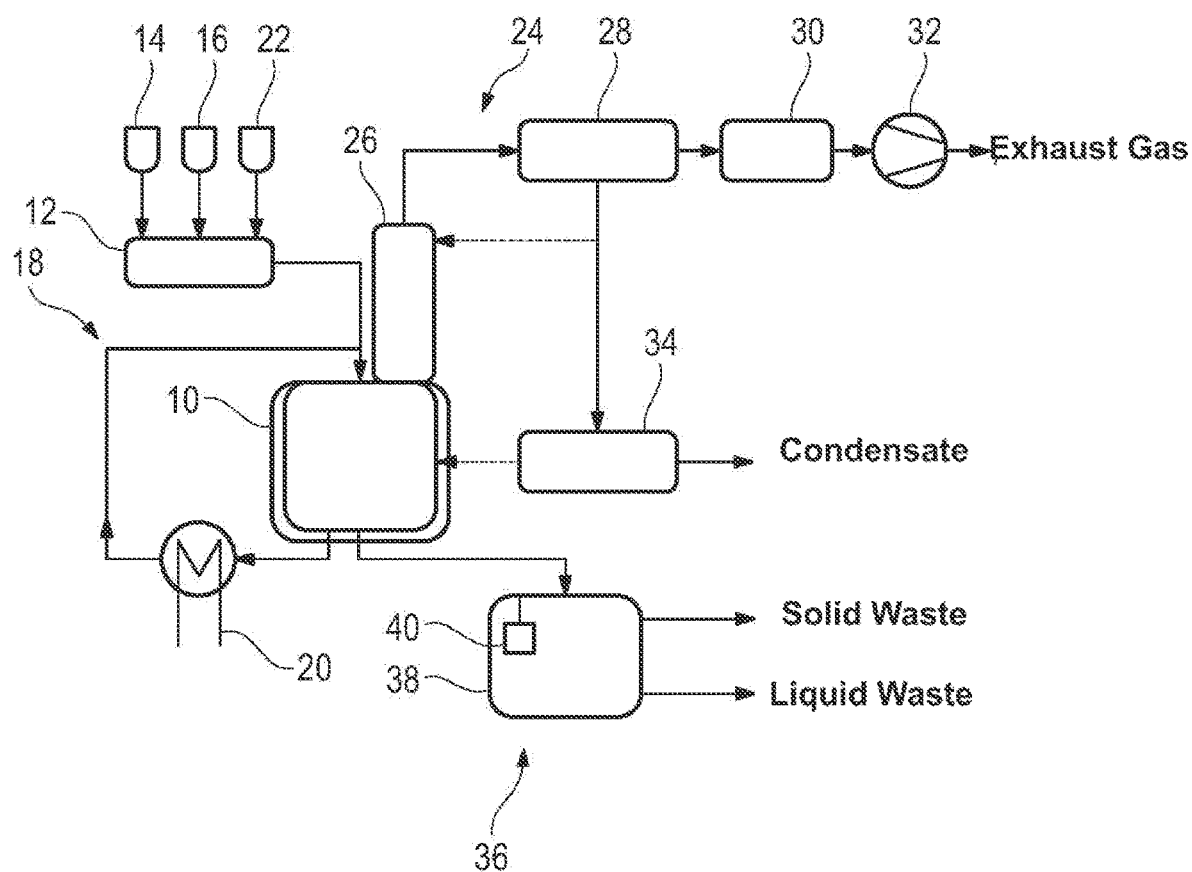

METHOD FOR CONDITIONING ION EXCHANGE RESINS AND APPARATUS FOR CARRYING OUT THE METHOD

TECHNICAL FIELD

The invention relates to a method for the conditioning of spent ion exchange resins from nuclear facilities and to an apparatus for the conditioning of spent ion exchange resins.

BACKGROUND OF THE INVENTION

Ion exchange resins are usually present as roughly spherical particles and are used, for example, during the operation of nuclear facilities to purify the coolant of the primary system, i.e. water. The aim of this purification is to avoid undesired deposits on the surfaces of the primary circuit components, to avoid corrosion, and to reduce the formation of contamination in the primary circuit of the facility. During this purification both acid cation exchangers and basic anion exchangers are used, with the former retaining metal cations and the latter retaining anionic compounds such as metal complexes. In addition, other organic substances such as complexing agents can be present on the spent ion exchange resins.

As some of the metals are radionuclides, spent or loaded ion exchangers are radioactive waste and have to be put into intermediate or permanent storage. Radioactively contaminated ion exchange resins also accrue during the decontamination of nuclear facilities, for example during primary circuit decontamination. In such a process, metal oxide layers present on the surfaces of the primary circuit components are detached by means of decontamination solutions, with the solutions passed over ion exchangers during or after decontamination to remove activity or metal cations contained therein.

For permanent or intermediate storage, contaminated ion exchangers, which are mainly organic resins with acid or basic groups, have to be conditioned. Conditioning generally comprises the transformation of radioactive waste into a storable form.

Typically, ion exchange resins are dried and embedded in a solid matrix for permanent storage, for example by burying in concrete. This, however, requires a large volume of solid matrix, usually more than six times the volume of ion exchange resin, generating large amounts of waste, which cause high costs for intermediate and permanent storage.

In order to reduce the waste volume, the ion exchange resins can be subjected to an oxidation treatment. The article by R. G. Charman and M. A. Twissell "Wet oxidation mobile pilot plant demonstration on organic radioactive wastes", European Commission EUR 19064, 1999, describes the current industrial standard for the wet oxidation of organic radioactive wastes. According to the state of the art for large-scale application, the decomposition of the ion exchange resins takes place at the boiling temperature of water and at atmospheric pressure, i.e. about 100° C. Mainly 50% hydrogen peroxide, as an oxidant, catalytic amounts of about 200 ppm or 0.2 mol/L of metal ions such as Fe(II) or Cu(II), and an antifoaming agent that has to be continuously added during decomposition, are used for the decomposition. During the entire decomposition period, the water volume that is introduced by the oxidant has to be distilled off. The addition of oxidant is linearly increased up to a maximum dosing rate of about 35 kg per hour. The pH is maintained between 3.4 and 4. With this method, about 95% of the organic material can be destroyed, corresponding to a TOC (total organic carbon) value of about 50,000 ppm. Technical problems or increased risks of this technology are the handling of 50% hydrogen peroxide, the accrual of radioactive secondary waste in the form of radioactive distillate and organic substances in the distillate, the formation of foam and the continuous dosing of antifoaming agents, a slow and limited dosing rate of the oxidant, an insufficient TOC decomposition (<99%), and the risk of an insufficient reaction control.

EP 2 2 248 134 B1 discloses a method for the conditioning of a radioactively contaminated ion exchange resin by mixing it with water and decomposing it, at least partially, into water-soluble fragments by an oxidant added to the water. The aqueous solution formed in this way is solidified with a binding agent, if applicable following concentration by the evaporation of water. After performing this method, a substantial part of the organic substance remains in the radioactive waste to be disposed of. Thus, the costs for the disposal and storage of the radioactive waste are not acceptable.

A process is known from U.S. Pat. No. 4,437,999 in which an insoluble organic material in the form of an organic resin or a biological substance containing contaminated material, such as radioactive wastes from a nuclear facility or wastes from the treatment of animal or vegetable tissue in a laboratory or a medical facility, is introduced into an aquiferous container. While the water is stirred, the material is exposed to ultraviolet light and ozone. The ozone oxidizes the organic resin or the biological material which, during oxidation, decomposes mainly into water and carbon dioxide. After the treatment with UV light and ozone for a predetermined period of time, essentially no resin or biological material is left. The contaminated material can be present in the residual water as a precipitate or in solution, or escape as a gas. Thus, the contaminated material can be separated from the water in any manner for disposal or further treatment. The method described in this document is a photocatalytic wet oxidation method. No post-treatment of the aqueous solution is performed and no information is given as to the TOC content of the radioactive waste.

An alternative solution is the complete oxidation of the ion exchange resins by an oxidant. DE 60 2004 003 464 T2 shows a method in which the ion exchange resin is decomposed in a solution of iron (II) sulfate with hydrogen peroxide and at high temperatures. Then, the metal ions which are left in the solution can be completely mineralized by precipitating them as metal salts. The method comprises in particular the following steps:
  adding ion exchange resins to a solution of iron sulfate and heating the solution, while stirring, to a temperature that is higher than 90° C. and lower than the boiling point of the solution;
  adding aqueous hydrogen peroxide to the solution and setting the pH of the resulting mixture with sulfuric acid or barium hydroxide to a pH range suitable for wet oxidation;
  adding barium hydroxide to the solution, after wet oxidation is finished, to increase the pH of the solution, and producing barium sulfate by means of sulfate in the solution. This, at the same time, allows the ammonium ions to escape from the solution as ammonium hydroxide or ammonia gas; and
  adding a solidifier to the barium sulfate slurry and homogeneously mixing it, and then letting the mixture stand until solidification.

As the method is performed near the boiling point of the solution, massive foaming occurs during the decomposition reaction, impeding the industrial application and/or requiring the addition of substantial amounts of an antifoaming agent. In addition, the method can only be used on a laboratory scale and not on an industrial scale. Further, in highly loaded ion exchange resins, for example from a chemical decontamination, no sufficient TOC reduction can be achieved as the hydrogen peroxide used for oxidation catalytically decomposes. Metal complexes cannot be reliably decomposed either by this method.

The publications mentioned below can be considered as technical background for the wet chemical conditioning of radioactive wastes. For example, JP 2000-065986 A describes a method that is to prevent intermediate products of an oxidative decomposition reaction from moving into a condensate and to allow the condensate to be re-used or released without any post-treatment. The method comprises the reaction of radioactive organic waste with hydrogen peroxide in the presence of iron ions and/or copper ions in an aqueous medium to oxidatively decompose the organic waste. To this end, a mixture of vapor and an intermediate product containing at least one low molecular weight organic acid, amines, ammonia, a cyano compound, and hydrocarbons is removed from an oxidation reaction tank and heated. Then the mixture is passed to a combustion apparatus equipped with an oxidation catalyst. In the apparatus, oxygen is supplied for a secondary oxidative decomposition of the intermediate product. The exhaust gas obtained from the combustion apparatus is cooled in a condenser to obtain a harmless and odorless exhaust gas and a condensate no longer containing any carbonaceous material.

JP 2003-057395 refers to a disposal method and a disposal facility for radioactive organic wastes which can be used for an oxidative decomposition of the radioactive organic wastes. When the reaction speed of the oxidative decomposition of the radioactive organic wastes by hydrogen peroxide in the reaction tank decreases from the middle of the reaction period, the amount of exhaust gases such as carbon dioxide generated by the oxidative decomposition of the radioactive organic wastes is reduced as well. An exhaust gas detector and a vapor detector monitor the amount of exaust gas generated and the amount of vapor generated, and send signals to a controller when they detect a decrease in the amount of exhaust gas produced or in the amount of vapor produced. The controller then causes fresh catalyst to be supplied to the reaction tank.

An article by L. J. Xu et al., "Treatment of spent radioactive cationic exchange resins used in nuclear power plants by Fenton-like oxidation process", E-Journal of Advanced Maintenance, vol. 9-2 (2017) 145-151, describes Fenton and Fenton-like oxidation processes that were developed to effectively decompose and mineralize spent radioactive ion exchange resins from nuclear power plants. In the article, the decomposition of spent cationic resins by a Fenton-like process for removing the chemical oxygen demand (COD) and reducing the weight of the waste is investigated. In particular, the effects of the initial pH, the $Cu^{2+}$ concentration and the $H_2O_2$ dosing on the resin decomposition are studied. The results show that a lower initial pH of the reaction solution brought about a higher COD deposition rate. As the $Cu^{2+}$ concentration and the $H_2O_2$ dosing increased, the COD removal rate of the resins first increased but then decreased. The efficiency of the resin decomposition (with respect to the COD decomposition rate) and the weight reduction were 99% and 39%, respectively, at a pH of 0.75 and a temperature of 95° C. using a reaction solution with 0.2 M $Cu^{2+}$ and 35 mL of 30% $H_2O_2$.

In the article by C. Srinivas et al., "Management of Spent Organic Ion-Exchange Resins by Photochemical Oxidation", WM'03 conference, 23-27 Feb. 2003, Tucson, Arizona (USA), the wet oxidation of spent ion exchange resin followed by a photo Fenton process is described. The photo Fenton process was performed at room temperature, and is said to require only a stoichiometric amount of hydrogen peroxide, while a chemical wet oxidation under Fenton oxidation conditions at 90-95° C. requires an excess of hydrogen peroxide of 70-200%.

DE10 2014 002 450 A1 discloses a method for the oxidative decomposition of nitrogen-containing compounds in the waste water of a nuclear facility by an electrochemical treatment with a diamond electrode as an anode (A) and a cathode (C) as a counter electrode. The destruction of the nitrogen-containing compounds and a reduction of the total nitrogen content are simultaneously achieved by setting, in a first stage of the process, a first current density at the anode (A) to oxidate the nitrogen-containing compounds, and then setting a second current density that is lower than the first current density, thereby reducing the dissolved total nitrogen content by the release of molecular nitrogen. It is also pointed out that diamond electrodes are used for the treatment of waste water to reduce the total organic carbon (TOC) content. However, the treatment of spent ion exchange resins from nuclear facilities is not addressed in the document.

SUMMARY OF THE INVENTION

It is the object of the invention to provide a method for the conditioning of spent ion exchange resins on an industrial scale that is more cost-effective and can be better controlled.

According to the present invention, the object is achieved by a method for conditioning of spent ion exchange resins from nuclear facilities, comprising the following steps:

mixing the spent ion exchange resins with water to form a reaction mixture;

setting and monitoring the pH of the reaction mixture in a range of from 1.0 to 3.5, preferably in a range of from 2.0 to 3.0;

adding an oxidant, preferably an aqueous solution of hydrogen peroxide, to the reaction mixture, with the temperature of the reaction mixture maintained at 90° C. or less, preferably at 85° C. or less, so that the spent ion exchange resin and the oxidant react with each other to form an aqueous reaction solution comprising organic reaction products of the spent ion exchange resin; and electrochemically oxidizing the organic reaction products in the reaction solution, thereby producing carbon dioxide and obtaining a carbon-depleted aqueous reaction solution having a TOC (total organic carbon) value of less than 50 ppm.

By using several successive oxidations steps, with the ion exchange resin reacted with an oxidant in a wet chemical oxidation step and the resulting reaction products electrochemically oxidized in a second step, an almost complete reaction of the ion exchange resin on an industrial scale can be granted so that, at the end, an aqueous reaction solution with a TOC value indicating the total organic carbon content in the solution of less than 50 ppm is obtained.

The complete mineralization of the ion exchange resins is an excellent way of reducing the volume of the radioactive waste, destroying organic complexing agents and metal complexes, and obtaining an almost carbon-free radioactive waste for permanent storage. In addition, the first oxidation step is performed at a low temperature of 90° C. or less, preferably at 85° C. or less. As water is used as a solvent, the reaction mixture does not boil at these low temperatures, thus significantly minimizing the formation of foam also during the exothermic reaction of the organic ion exchange resins with hydrogen peroxide. This allows a controlled process management, and the use of antifoaming agents can be substantially reduced or dispensed with altogether. This also reduces the amount of secondary waste.

The controlled reaction management reduces the risk of process interruptions so that the method can be performed with fewer interruptions and thus more economically.

In addition, the low reaction temperatures mean that the oxidant, in particular an aqueous solution of hydrogen peroxide, shows less self-decomposition. Thus, a smaller amount of the oxidant is required for the complete decomposition of the ion exchange resins.

By using a multi-stage oxidation method, the two partial steps of the oxidation procedure can be separated in the process, thus allowing a higher capacity utilization of a corresponding facility for the conditioning of spent ion exchange resins.

The ion exchange resins can also contain organic complexing agents, for example in the free form or in the form of metal complexes bound to the ion exchange resins, as well as further organic substances. In particular, organic complexing agents can serve as chelating agents for radioactive substances in immobilized waste such as concrete, and thus increase their mobility. Some organic substance classes can also have negative effects on the strength of the concrete. This reduces the long-term stability of the solidified waste, thereby increasing the danger of groundwater contamination in intermediate and/or permanent storage. Thus, the method according to the present invention is preferably designed to condition spent ion exchange resins which also contain further organic compounds, in particular organic complexing agents.

The reaction mixture for wet chemical oxidation can comprise water and spent ion exchange resin in a volume ratio from 3:1 to 1.5:1, preferably from 2.5:1 to 2:1, and, particularly preferably, about 2:1. As high water/ion exchange resin volume ratios can be used as well, the ion exchange resin can already be transferred to the reaction vessel together with water without having to remove large amounts of excess water prior to the wet chemical oxidation. A volume ratio that is too low results in increased foaming and makes the control of the decomposition reaction difficult; a higher volume ratio results in a reduction of the batch size.

Preferably, the temperature of the reaction mixture is maintained in a range from 60 to 90° C., preferably from 70 to 85° C., and particularly preferably in a range from 70 to 80° C. Thus, on the one hand, a sufficiently high temperature for a fast reaction course can be utilized and, on the other hand, the formation of foam can be prevented. At the same time, a low temperature limits the self-oxidation of the oxidant, in particular in the case of an aqueous solution of hydrogen peroxide as an oxidant, so that a smaller excess of oxidant can be used.

As the decomposition reaction is highly exothermic, the reaction vessel can be coupled to a heating-cooling circuit allowing the reaction mixture to be heated or cooled, as required, in order to maintain the temperature of the reaction mixture stable. In a controlled reaction management, the desired temperature can also be exclusively set by the reaction heat, at least in the beginning of the oxidation reaction.

The pH of the reaction mixture can be set and controlled by adding a mineral acid, preferably sulfuric acid or nitric acid, or a base, preferably an alkali hydroxide, for example in the form of caustic soda, or alkaline earth hydroxides. By doing so, the pH of the reaction mixture can be set in a range from 1.0 to 3.5, preferably in a range from 2.0 to 3.0, and continuously readjusted. At a pH of the reaction mixture of more than 3.5, there is the risk that iron salts dissolved in the reaction mixture or an optionally added catalyst precipitate. At a pH below 1.0 to 2.0, the method cannot be performed economically due to the significantly reduced reaction speed.

As an oxidant, an aqueous solution of hydrogen peroxide at a concentration of 30 to 35 weight percent can be used. As the reaction with hydrogen peroxide is highly exothermic, the desired reaction temperature can already be reached and maintained by means of the reaction heat. At the same time, it is advantageous not to use solutions of a higher concentration with more than 40 weight percent of hydrogen peroxide at the beginning of the reaction as the reaction would then be more difficult to control. According to a preferred embodiment, a solution of a lower concentration with 30 to 35 weight percent of hydrogen peroxide is to be used at the beginning of the oxidation reaction, preferably over at least half of the reaction period, and after the temperature of the reaction mixture has stabilized, a solution of a higher concentration, for example with up to 50 weight percent of hydrogen peroxide, is to be used. Thus, a lower volume of oxidant can be added.

Preferably, an aqueous solution of hydrogen peroxide as an oxidant is added to the reaction mixture so that the concentration of hydrogen peroxide in the reaction mixture is at least 20,000 ppm. Thus, it is ensured that a sufficiently high concentration is present to completely decompose the spent ion exchange resin.

In a preferred embodiment, no antifoaming agent is added to the reaction mixture. This saves the costs for the antifoaming agent and the additional dosing expenditure.

The addition of the oxidant can be terminated and the electrochemical oxidation started when the aqueous reaction solution becomes a clear and preferably transparent solution. At this point, the original ion exchange resin has completely decomposed into soluble, low molecular weight organic compounds so that no larger particles of the ion exchange resin can block the electrodes in the subsequent electrochemical oxidation step. At the same time, the point at which the ion exchange resin has been completely decomposed can be easily determined in this way. In contrast to the photocatalytic decomposition, the electrochemical oxidation does not require a transparent radiolucent solution.

The wet chemical oxidation of a batch of 100 to 500 L of an organic ion exchange resin is usually completed within 8 hours and requires about ten to twenty times the volume of 35 percent hydrogen peroxide solution as compared to the volume of the ion exchange resin provided. The volume of the reaction vessel has to have the respective dimensions. At this point of the process, the TOC value in the reaction solution has already been lowered. However, the inventors have recognized that a reduction of the carbon content by wet chemical oxidation using hydrogen peroxide cannot be carried out endlessly. Nevertheless, a TOC value as low as possible is desirable as organic components radiolyze in the radioactive waste ultimately obtained and can affect its storage stability.

Thus, according to the present invention, the wet chemical oxidation with hydrogen peroxide is followed by an electrochemical oxidation that is preferably performed by means of a boron-doped diamond electrode, more preferably at a voltage of 5 V or less. A boron-doped diamond electrode can generate hydroxyl radicals from water that can be used for further oxidation of the organic reaction products from the wet chemical oxidation. The addition of extra oxidant during the electrochemical oxidation is not necessary and not provided according to the present invention. At the same time, the electrochemical oxidation allows the use of relatively large overvoltages required to generate carbon dioxide as a gaseous reaction product at the electrode. However, the overvoltage chosen should not be too high as otherwise water can electrolytically split into hydrogen and oxygen, allowing uncontrolled oxyhydrogen reactions.

Decoupling the decomposition of the ion exchange resins by wet chemical oxidation from the TOC reduction by electrochemical oxidation can also significantly reduce the time needed for performing the method. In addition, highly loaded ion exchange resins can also be reliably conditioned by electrochemical oxidation.

Advantageously, prior to the electrochemical oxidation, the water introduced from the reaction mixture and/or from the aqueous reaction solution by the addition of hydrogen peroxide can be removed from the reaction vessel by vacuum distillation. Preferably, the vacuum distillation can already be performed during the wet chemical oxidation with hydrogen peroxide. This reduces the reaction volume for the electrochemical oxidation, which allows the reactor to be used for the electrochemical oxidation to have smaller dimensions.

At the same time, the vacuum distillation is used for the removal of the carbon dioxide already generated and other harmless gaseous reaction products. Moreover, an additional airborne-particle filter can be provided to purify the extracted gas. As compared to a distillation at atmospheric pressure, vacuum distillation allows the generation of a higher throughput, thereby allowing the respective process step to be shortened.

Apart from the water of the reaction mixture and/or the aqueous reaction solution, highly volatile organic substances are evaporated by vacuum distillation. As, however, these are at least partially to be further decomposed to form carbon dioxide, it is advantageous to return them to the reaction mixture and/or the reaction solution in a recycling process. Thus, the water removed by vacuum distillation can be additionally purified by reverse osmosis in order to separate volatile organic substances and return them to the reaction mixture and/or the aqueous reaction solution. At the same time, the water distilled off can be obtained in a purified condition by reverse osmosis and subsequently disposed of.

A further object of the invention is an apparatus for the conditioning of spent ion exchange resins, comprising
- a reaction vessel for the accommodation of spent ion exchange resins and water;
- an oxidant supply connected to the reaction vessel;
- a vacuum distillation unit comprising a spray column connected to the reaction vessel and a condenser; and
- a unit for electrochemical oxidation that is arranged within the reaction vessel or connected to it, with the unit for electrochemical oxidation having a boron-doped diamond electrode.

The wet chemical oxidation can take place in the reaction vessel, while the oxidant, in particular an aqueous solution of hydrogen peroxide, is dosed by means of the oxidant supply. Excess water and gaseous reaction products can be removed, even during the wet chemical oxidation, from the reaction mixture and/or the reaction solution by means of a vacuum distillation unit.

The reaction vessel is designed to accommodate a batch of ion exchange resin from the coolant reprocessing system of a nuclear facility or a decontamination facility. Typically, volumes of 100 to 500 L of ion exchange resins are processed. In particular the wastes from the decontamination of nuclear facilities can be highly loaded with organic complexing agents and other organic substances.

Highly volatile organic substances that were evaporated together with the water can be returned into the reaction mixture and/or the reaction solution by means of a spray column for further reaction in a recycling process after they have been re-liquefied in the condenser.

Generally, other columns can be used instead of the spray column, the choice of which can be based on the desired separation effect.

A unit for electrochemical oxidation that has a boron-doped diamond electrode, and is arranged within the reaction vessel or connected to it, can electrochemically oxidate the reaction solution obtained after the wet chemical oxidation in a second step so that an aqueous reaction solution with a total carbon content (TOC value) of less than 50 ppm can be obtained.

Advantageously, the apparauts also has a reverse osmosis unit that is connected to the condenser. Thus, volatile organic substances that were distilled off together with the water are re-liquefied in the condenser and can subsequently be removed from the water via the reverse osmosis unit and returned to the reaction mixture and/or the reaction solution, while, at the same time, the water distilled off can be removed.

The unit for electrochemical oxidation can comprise a reactor and a boron-doped diamond electrode, with the reactor connected to the reaction vessel and the boron-doped diamond electrode arranged in the reactor. Thus, the aqueous reaction solution obtained from the wet chemical oxidation is transferred to the reactor and then further electrochemically treated by means of the boron-doped diamond electrode.

The provision of a reactor for electrochemical oxidation in addition to the reaction vessel for wet chemical oxidation can be used to separate the two process steps, thus allowing a particularly economical operation of the facility.

In general, the electrode can also be arranged in the reaction vessel such that no separate reactor is required for the electrochemical oxidation.

DESCRIPTION OF THE FIGURE

In the attached drawing

FIG. 1 is a schematic diagram of an apparatus for performing the method according to the present invention.

DETAILED DESCRIPTION OF PREFERRED EMBODIMENTS

Further advantages and characteristics of the invention can be seen from the subsequent description of a preferred embodiment and the drawing, to which reference is made. However, they should not be construed as limiting.

The single FIGURE shows a reaction vessel 10 into which spent ion exchange resin together with water is dosed by means of a dosing unit 12 to obtain a reaction mixture within the reaction vessel 10. In particular, the spent ion exchange resin can contain organic complexing agents. A first reservoir 14 with spent ion exchange resin and a second reservoir 16 with water can be connected to the dosing unit 12. The obtained reaction mixture is constantly stirred by means of a stirrer.

In the reaction mixture provided, the volume ratio between water and ion exchange resin is advantageously about 2:1, more preferably between about 3:1 and 1.5:1.

The reaction vessel 10 is coupled to a heating-cooling circuit 18 with a heat exchanger 20. The reaction vessel 10 is advantageously present as a double-walled reaction vessel 10, whereby a coolant of the heating-cooling circuit 18 is passed within the double wall.

A small amount of an iron(II) or copper(II) salt can be added as a catalyst to the reaction mixture in the reaction vessel 10, for example an amount of 200 ppm.

The pH of the reaction mixture is set to a value from 2.5 to 3 by means of a mineral acid, for example sulfuric or nitric acid, and/or a base, for example caustic soda, and continuously checked.

Then, an oxidant is added to the reaction mixture from an oxidation supply 22 by means of the dosing unit 12.

In the following, an aqueous solution of hydrogen peroxide is used as an oxidant. However, in general, other oxidants such as ozone can also be used.

First, an aqueous solution of hydrogen peroxide with 35 weight percent of hydrogen peroxide is added to the reaction mixture, starting with a dosing speed of, for example, 200 g of solution per liter of ion exchange resin and hour. After establishing an equilibrium, the dosing speed can be continuously increased. After about half of the hydrogen peroxide needed has been added, its concentration in the oxidation solution can be increased up to 50 weight percent of hydrogen peroxide.

The temperature of the reaction mixture is set to 60 to 90° C., preferably to 70 to 80° C. However, boiling of the reaction mixture should be avoided so that no or only little foaming occurs during the wet chemical oxidation of the ion exchange resin so that the addition of an antifoaming agent is not necessary. However, in general, an antifoaming agent could be added, if necessary, via the dosing unit 12.

Heating to the reaction temperature can take place exclusively due to the heat generated by the exothermic reaction, and be controlled after reaching the desired reaction temperature by means of the heating-cooling circuit 18.

The dimensions of the reaction vessel 10 are such that all required volumes can be accommodated. When using an aqueous solution of hydrogen peroxide with a content of 35 weight percent of hydrogen peroxide, at least ten to twenty times the volume of the ion exchange resin provided has to be added.

The wet chemical oxidation is continued until the reaction mixture has become a transparent and clear reaction solution. At this point, the originally provided ion exchange resin has completely decomposed into low molecular weight soluble organic substances. This takes the wet chemical oxidation about 8 hours.

Following wet chemical oxidation, the TOC value of the reaction solution is preferably at most 100 g/L or less, more preferably at most 75 g/L, and particularly preferably at most 50 g/L.

A vacuum distillation unit 24 comprising a spray column 26 that is connected to the reaction vessel 10 and a condenser 28, as well as an airborne-particle filter 30 arranged between the condenser 28 and a vacuum pump 32 is connected to the reaction vessel 10. The vacuum distillation unit 24 can already be operated during the wet chemical oxidation.

The ascending vapor from the reaction mixture and/or the reaction solution contains water, oxygen, carbon dioxide, and highly volatile organic compounds. The latter can already partially re-condense by rectification within the spray column 24 and flow back into the reaction vessel 10.

The water and the highly volatile organic compounds, after having completely ascended through the spray column 26, then recondense in the condenser 28, while the oxygen and the carbon dioxide are extracted by the vacuum pump 32.

In addition, an airborne-particle filter 30, for example a HEPA filter, can be provided to purify the exhaust gases to prevent further components of the vapor from being extracted together with the oxygen and the carbon dioxide.

The obtained condensate can be returned from the condenser 28 to the reaction vessel 10 via the spray column 26.

Furthermore, a reverse osmosis unit 34 can be provided that is connected to the condenser 28 and the reaction vessel 10. The condensate obtained from the condenser 28 can be purified by means of the reverse osmosis unit 34. Volatile organic compounds still contained therein are removed from the condensate by reverse osmosis and returned to the reaction vessel 10. Then the purified condensate can be disposed of so that the total volume of the reaction mixture and/or the reaction solution in the reaction vessel 10 can be reduced.

The reaction solution obtained from the wet chemical oxidation is then transferred to a unit for electrochemical oxidation 36 that comprises a reactor 38 and a boron-doped diamond electrode 40.

In an alternative embodiment, it is possible that the unit for electrochemical oxidation 36 is arranged within the reaction vessel 10 together with the reactor 38 and the boron-doped diamond electrode 40. Therefore, the reaction solution obtained after wet chemical oxidation does not have to be transferred to a separate reactor 38.

The organic reaction products from the wet chemical oxidation are electrochemically oxidized within the reactor 38. To this end, a voltage of about 5 V is preferably applied to the boron-doped diamond electrode 40, and a current of about 200 mA/cm$^2$ is used. In the electrochemical oxidation, carbon dioxide is produced from the reaction products of the wet chemical oxidation, and a carbon-depleted aqueous reaction solution with a final total carbon content (TOC) of less than 50 ppm is obtained.

The boron-doped diamond electrode 40 has an active surface of at least about 1 m$^2$. Preferably, a boron-doped diamond electrode 40 with an active surface of up to 5 m$^2$ is used. The larger the chosen active surface of the boron-doped diamond electrode 40 is, the faster the electrochemical oxidation can be completed. Preferably, the boron-doped diamond electrode 40 is a grid electrode.

Under ideal conditions, the electrochemical oxidation takes about 8 hours so that the entire process can be completed in about 16 hours. If the reactor 38 is operated independently from the reaction vessel 10, it is possible that a wet chemical oxidation is already performed with the next batch of ion exchange resin in the reaction vessel 10 while the electrochemical oxidation of the previous batch takes place in the reactor 38. With this parallel procedure, the apparatus can be better utilized and thus operated more economically.

Subsequently, the carbon-depleted reaction solution can be subjected to a post-treatment in which the radioactive metals contained can be obtained as a small volume of solid waste. To this end, the metals, for example, can be precipitated and the excess water can be distilled off. Alternatively, the excess water can be used directly for cementing the carbon-depleted reaction solution containing the radioactive metals. Overall, as compared to direct cementing of the ion exchange resin, the waste volume can be reduced by a factor 5 to 20 by using the method. The radioactive waste thus obtained is almost carbon-free, in particular free of organic complexing agents, and thus storage-stable.

The invention claimed is:

1. A method for conditioning of spent ion exchange resins from nuclear facilities, comprising the steps of:
   mixing the spent ion exchange resins with water to form a reaction mixture;
   setting and monitoring the pH of the reaction mixture in a range from 1.0 to 3.5;
   adding an oxidant to the reaction mixture, with the temperature of the reaction mixture maintained at 90° C. or less, so that the spent ion exchange resin and the oxidant react with each other to form an aqueous reaction solution comprising organic reaction products of the spent ion exchange resin; and
   electrochemically oxidizing the organic reaction products in the reaction solution by means of a boron-doped diamond electrode, wherein carbon dioxide is produced and a carbon-depleted aqueous reaction solution having a TOC (total organic carbon) value of less than 50 ppm is obtained.

2. The method according to claim 1, characterized in that the ion exchange resins contain organic complexing agents.

3. The method according to claim 1, characterized in that the reaction mixture comprises water and spent ion exchange resin in a volume ratio of 3:1 to 1.5:1.

4. The method according to claim 1, characterized in that the temperature of the reaction mixture is maintained in a range from 60 to 90° C.

5. The method according to claim 1, characterized in that the pH of the reaction mixture is set and controlled by the addition of a mineral acid or a base.

6. The method according to claim 1, characterized in that the oxidant is an aqueous solution of hydrogen peroxide at a concentration of 30 to 35 weight percent.

7. The method according to claim 1, characterized in that the hydrogen peroxide is added to the reaction mixture such that the concentration of hydrogen peroxide in the reaction mixture is at least 20,000 ppm.

8. The method according to claim 1, characterized in that no antifoaming agent is added to the reaction mixture.

9. The method according to claim 1, characterized in that the addition of the oxidant is terminated and the electrochemical oxidation is started when the aqueous reaction solution becomes a clear and transparent solution.

10. The method according to claim 1, characterized in that the electrochemical oxidation is performed at a voltage of 5 V or less.

11. The method according to claim 1, characterized in that, prior to the electrochemical oxidation, water from the reaction mixture and/or the aqueous reaction solution is removed from the reaction vessel by means of vacuum distillation.

12. The method according to claim 11, characterized in that the water removed by vacuum distillation is purified by means of reverse osmosis to contain volatile organic substances, and the volatile organic substances are returned to the reaction mixture and/or the aqueous reaction solution.

13. The method of claim 1, wherein the range of the reaction mixture pH is 2.0 to 3.0.

14. The method of claim 1, wherein the oxidant is an aqueous solution of hydrogen peroxide.

15. The method of claim 1, wherein the reaction mixture is maintained at 85° C. or less.

16. The method of claim 3 wherein the volume ratio of the water and spent ion exchange resin is 2.5:1 to 2:1.

17. The method of claim 4 wherein the temperature range of the reaction mixture is 70 to 85° C.

18. The method of claim 5 wherein the mineral acid is sulfuric acid or nitric acid.

19. The method of claim 5 wherein the base is alkali hydroxide or alkaline earth hydroxide.

20. An apparatus for conditioning of spent ion exchange resins, comprising:
    a reaction vessel for the accommodation of the spent ion exchange resins and water;
    an oxidant supply that is connected to the reaction vessel;
    a vacuum distillation unit comprising a spray column that is connected to the reaction vessel and a condenser; and
    a unit for electrochemical oxidation that is arranged within the reaction vessel or connected to it, with the unit for electrochemical oxidation having a boron-doped diamond electrode.

21. The facility according to claim 20, characterized in that the condenser is connected to a reverse osmosis unit.

22. The facility according to claim 20, characterized in that the unit for electrochemical oxidation comprises a reactor and a boron-doped diamond electrode, wherein the reactor is connected to the reaction vessel and the boron-doped diamond electrode is arranged in the reactor.

* * * * *